(12) United States Patent
Oren et al.

(10) Patent No.: US 8,867,600 B2
(45) Date of Patent: Oct. 21, 2014

(54) TURBO EQUALIZATION FOR DIVERSITY RECEIVERS

(75) Inventors: Roy Oren, Magshimim (IL); Tomer Yablonka, Tel-Aviv (IL)

(73) Assignee: Siano Mobile Silicon Ltd., Kfar-Netter (IL)

( * ) Notice: Subject to any disclaimer, the term of this patent is extended or adjusted under 35 U.S.C. 154(b) by 121 days.

(21) Appl. No.: 13/397,732

(22) Filed: Feb. 16, 2012

(65) Prior Publication Data

US 2013/0215952 A1 Aug. 22, 2013

(51) Int. Cl.
H03H 7/30 (2006.01)
H03H 7/40 (2006.01)
H03K 5/159 (2006.01)

(52) U.S. Cl.
USPC .......................................... 375/232; 375/347

(58) Field of Classification Search
USPC ................................................ 375/232, 347
See application file for complete search history.

(56) References Cited

U.S. PATENT DOCUMENTS

| | | | |
|---|---|---|---|
| 6,418,164 B1 | 7/2002 | Endres et al. | |
| 7,324,616 B2 | 1/2008 | Sobchak et al. | |
| 7,349,667 B2 | 3/2008 | Magee et al. | |
| 7,792,221 B2 * | 9/2010 | Lin ............... | 375/340 |
| 8,290,024 B2 | 10/2012 | Sampath et al. | |
| 2006/0146926 A1 | 7/2006 | Bhoja et al. | |
| 2009/0296803 A1 | 12/2009 | Wang et al. | |
| 2012/0063553 A1 * | 3/2012 | Carwana et al. .............. | 375/347 |

OTHER PUBLICATIONS

Mayyas et al., "Leaky LMS Algorithm: MSE Analysis for Guassian Data," IEEE Transactions on Signal Processing, vol. 45, No. 4, pp. 927-934, Apr. 1997.
Raphaeli et al., "Linear Equalizers for Turbo Equalization—A New Optimization Criterion for Determining the Equalizer Taps," 2nd International Symposium on Turbo Codes and Related Topics, pp. 371-374, Brest, France, Sep. 4-7, 2000.
Tuchler et al., "Minimum Mean Squared Error Equalization Using A-Priori Information," IEEE Transactions on Signal Processing, vol. 50, No. 3, pp. 673-683, Mar. 2002.
Lee et al., "Switching LMS Linear Turbo Equalization," Proceedings of the 2004 IEEE International Conference on Acoustics, Speech and Signal Processing (ICASSP 2004), vol. 4, pp. IV641-1V644, Montreal, Canada, May 17-21, 2004.
Choi et al., "Adaptive Linear Turbo Equalization Over Doubly Selective Channels," IEEE Journal of Oceanic Engineering, vol. PP, issue 99, Aug. 12, 2011.
U.S. Appl. No. 13/187,525, filed Jul. 21, 2011.
U.S. Appl. No. 13/187,525 Office Action dated Mar. 6, 2014.

* cited by examiner

Primary Examiner — Tanmay Shah
(74) Attorney, Agent, or Firm — D. Kligler J.P. Services Ltd.

(57) ABSTRACT

Apparatus includes a slave equalizer chain, which includes a first decoder and a first adaptive filter including first coefficients, and is configured to filter a first signal using the first adaptive filter to produce a first filtered signal, to decode the first filtered signal using the first decoder to generate a first output, and to adapt the first coefficients based at least on the first output. A master equalizer chain includes a second decoder and a second adaptive filter including second coefficients, and is configured to filter a second signal using the second adaptive filter to produce a second filtered signal, to calculate a weighted combination of the second filtered signal and the first filtered signal produced in the slave equalizer chain, to decode the weighted combination using the second decoder to generate a second output, and to adapt the second coefficients based at least on the second output.

24 Claims, 3 Drawing Sheets

TURBO EQUALIZATION FOR DIVERSITY RECEIVERS

FIELD OF THE INVENTION

The present invention relates generally to communication systems, and particularly to methods and systems for equalization in diversity receivers.

BACKGROUND OF THE INVENTION

Adaptive equalization techniques are commonly used in communication receivers, for example in order to improve Signal to Noise Ratio (SNR) or to reduce Inter-Symbol Interference (ISI). Turbo equalization is a special class of equalization techniques that adapt the equalizer based on feedback from a decoder. Turbo equalization techniques are described, for example, by Raphaeli and Saguy, in "Linear Equalizers for Turbo Equalization—A New Optimization Criterion for Determining the Equalizer Taps," $2^{nd}$ International Symposium on Turbo Codes and Related Topics, Brest, France, Sep. 4-7, 2000, pages 371-374, which is incorporated herein by reference.

Tüchler and Singer analyze Turbo equalizer performance, in "Minimum Mean Squared Error Equalization using A-Priori Information," IEEE Transactions on Signal Processing, volume 50, no. 3, March, 2002, pages 673-683, which is incorporated herein by reference. Lee et al. describe a specific class of Turbo equalization algorithms, in "Switching LMS Linear Turbo Equalization," Proceedings of the 2004 IEEE International Conference on Acoustics, Speech, and Signal Processing (ICASSP 2004), Montreal, Canada, which is incorporated herein by reference. Yet another Turbo equalization technique is described by Choi et al., in "Adaptive Linear Turbo Equalization over Doubly Selective Channels," IEEE Journal of Oceanic Engineering, 2011, which is incorporated herein by reference.

SUMMARY OF THE INVENTION

An embodiment of the present invention that is described herein provides an equalization apparatus including a slave equalizer chain and a master equalizer chain. The slave equalizer chain includes a first decoder and a first adaptive filter including first coefficients, and is configured to receive a first signal from a first antenna, to filter the first signal using the first adaptive filter to produce a first filtered signal, to decode the first filtered signal using the first decoder so as to generate a first output, and to adapt the first coefficients based at least on the first output. The master equalizer chain includes a second decoder and a second adaptive filter including second coefficients, and is configured to receive a second signal from a second antenna, to filter the second signal using the second adaptive filter to produce a second filtered signal, to calculate using at least one weighting filter a weighted combination of the second filtered signal and the first filtered signal produced in the slave equalizer chain, to decode the weighted combination using the second decoder so as to generate a second output, and to adapt the second coefficients based at least on the second output.

In some embodiments, the at least one weighting filter includes first and second weighting filters that are configured to filter the first filtered signal and the second filtered signal, respectively, so as to produce the weighted combination. In an embodiment, the first and second weighting filters have respective first and second transfer functions, which depend on a first Signal to Noise Ratio (SNR) of the first filtered signal as a function of frequency and on a second SNR of the second filtered signal as a function of frequency.

In a disclosed embodiment, the master and slave equalizer chains are configured to estimate respective first and second noise spectra of the first and second filtered signals, to compute the first and second SNRs based on the first and second noise spectra, and to calculate and set the first and second transfer functions based on the first and second SNRs. In another embodiment, the master and slave equalizer chains are configured to adapt respective responses of the first and second weighting filters depending on the first and second filtered signals.

In some embodiment, the at least one filter includes a single weighting filter that is configured to filter a difference between the first filtered signal and the second filtered signal, and the apparatus includes a circuit for summing an output of the single weighting filter with the first filtered signal, so as to produce the weighted combination. In an embodiment, the master equalizer chain is configured to adapt a response of the single weighting filter so as to reduce an error in the weighted combination. In some embodiments, the master and slave equalizer chains are configured to communicate only unidirectionally, from the slave equalizer chain to the master equalizer chain.

In some embodiments the apparatus includes at least an additional slave equalizer chain, which includes a third decoder and a third adaptive filter including third coefficients, and which is configured to receive a third signal from a third antenna, to filter the third signal using the third adaptive filter to produce a third filtered signal, to decode the third filtered signal using the third decoder so as to generate a third output, to adapt the third coefficients based at least on the third output, and the master equalizer chain is configured to calculate the weighted combination based on the first, second and third filtered signals. In an embodiment, the slave equalizer chain includes an intermediate equalizer chain, and the master, intermediate and additional slave equalizer chains are connected in a daisy chain such that the additional slave equalizer chain is connected to the intermediate equalizer chain and the intermediate equalizer chain is connected to the master equalizer chain.

In some embodiments, the master and slave equalizer chains are implemented in respective, different semiconductor chips. In an embodiment, the master and slave equalizer chains are configured to adapt the first and second coefficients by applying a sequence of adaptation iterations to a block of previously-received samples of the first and second signals that are stored in a memory.

There is additionally provided, in accordance with an embodiment of the present invention, a method for equalization including receiving a first signal from a first antenna, filtering the first signal using a first adaptive filter including first coefficients to produce a first filtered signal, decoding the first filtered signal using a first decoder to produce a first output, and adapting the first coefficients based at least on the first output. A second signal is received from a second antenna, and the second signal is filtered using a second adaptive filter including second coefficients to produce a second filtered signal. A weighted combination of the second filtered signal and the first filtered signal is calculated using at least one weighting filter. The weighted combination is decoded using a second decoder to produce a second output. The second coefficients of the second adaptive filter are adapted based at least on the second output.

There is also provided, in accordance with an embodiment of the present invention, a receiver including first and second antennas, first and second receiver front-ends coupled to the respective first and second antennas, a slave equalizer chain and a master equalizer chain. The slave equalizer chain includes a first decoder and a first adaptive filter including first coefficients, and is configured to receive a first signal from the first antenna via the first receiver front-end, to filter the first signal using the first adaptive filter to produce a first filtered signal, to decode the first filtered signal using the first decoder so as to generate a first output, and to adapt the first coefficients based at least on the first output. The master equalizer chain includes a second decoder and a second adaptive filter including second coefficients, and is configured to receive a second signal from the second antenna via the second receiver front-end, to filter the second signal using the second adaptive filter to produce a second filtered signal, to calculate using at least one weighting filter a weighted combination of the second filtered signal and the first filtered signal produced in the slave equalizer chain, to decode the weighted combination using the second decoder so as to generate a second output, and to adapt the second coefficients based at least on the second output.

The present invention will be more fully understood from the following detailed description of the embodiments thereof, taken together with the drawings in which:

DETAILED DESCRIPTION OF EMBODIMENTS

Overview

Figure 1:
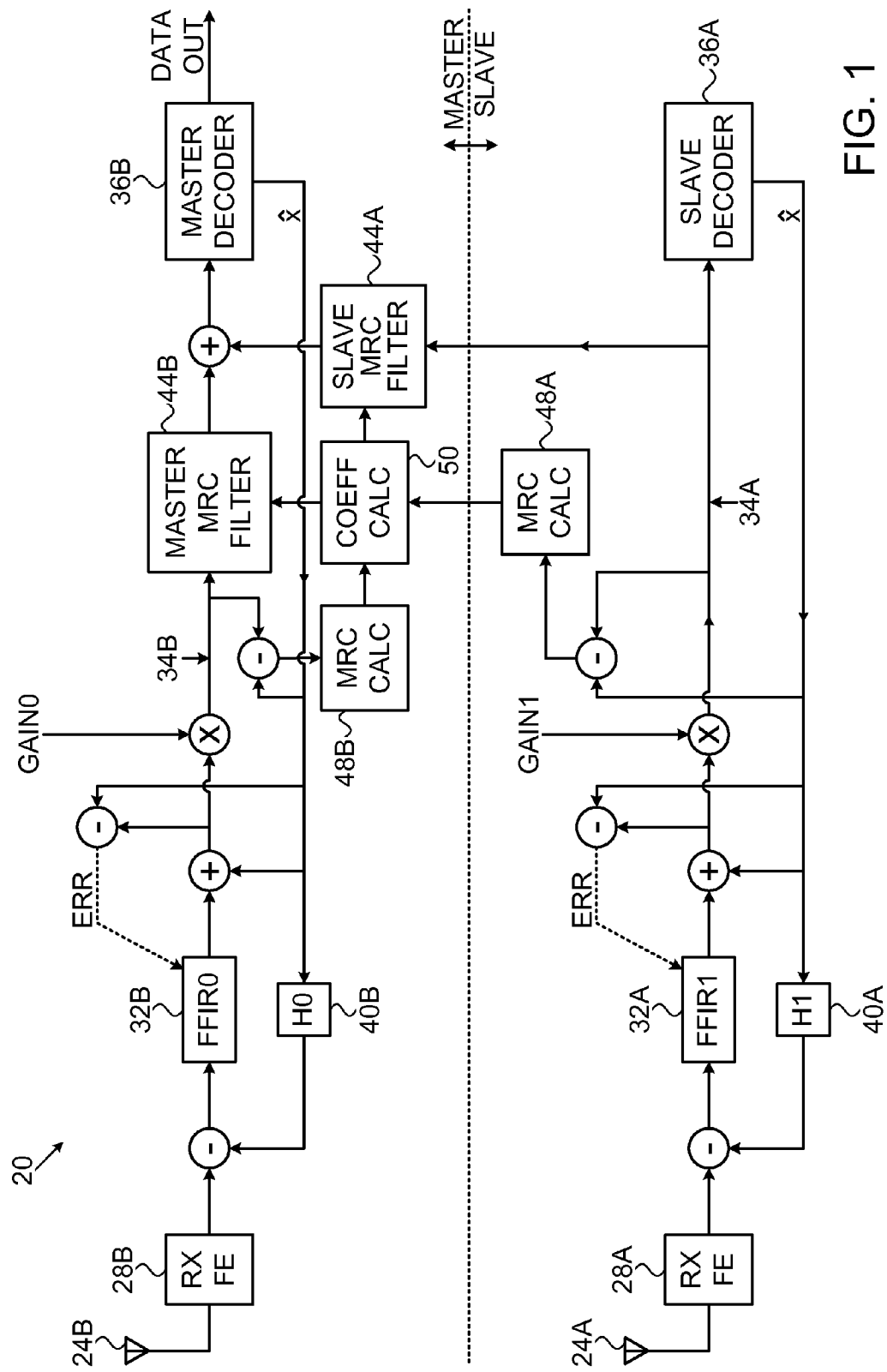
FIG. 1 is a block diagram that schematically illustrates a diversity receiver, in accordance with an embodiment of the present invention.

In a typical Turbo equalizer, a received signal is filtered by an adaptive filter and then provided to a decoder. The filter coefficients are adapted iteratively using feedback from the decoder, such as likelihood measures that the decoder computes for the bits carried by the signal. Equalization processes of this sort are described, for example, in U.S. patent application Ser. No. 13/187,525, which is assigned to the assignee of the present patent application and whose disclosure is incorporated herein by reference.

Some receiver configurations use antenna diversity, i.e., decode the received signal using multiple antennas and respective processing chains. In order to use Turbo equalization in a receiver that uses antenna diversity, it is possible in principle to control adaptive filters in all the processing chains using the output of one master decoder. Such a solution, however, is difficult to put into practice, especially when each processing chain is to be implemented in a separate chip or device. The data throughput that needs to be exchanged between processing chains in such a scheme is extremely high and is bidirectional. Moreover, such a scheme is not scalable to more than two processing chains, and its convergence is sometimes problematic.

Embodiments of the present invention that are described herein provide improved methods and systems for adaptive equalization in communication receivers. In the disclosed embodiments, a diversity receiver comprises at least two equalizers that receive respective signals from different receive antennas. One equalizer is defined as a master equalizer and the other as a slave equalizer. Each of the two equalizers comprises a respective adaptive filter (denoted forward filter, in the present example a forward Finite Impulse Response filter—FFIR) and a respective decoder. Each equalizer filters the received signal using the respective FFIR, and provides the filtered signal to the respective decoder.

The subsequent processing, however, differs between the master and slave equalizers: In the slave equalizer, the decoder output is used for adapting the FFIR. The master equalizer, on the other hand, adapts its FFIR based on a combination of the FFIR outputs from both the master and slave equalizers.

In some embodiments, the master equalizer produces the combination of FFIR outputs by filtering the master FFIR output with a master Maximum Ratio Combining (MRC) filter, filtering the slave FFIR output with a slave MRC filter, and summing the MRC filter outputs. The sum is provided to the decoder of the master equalizer. In an embodiment, the receiver computes the responses of the two MRC filters such that the master and slave FFIR outputs are weighted, in each frequency bin, according to the Signal to Noise Ratios (SNRs) at the FFIR outputs at that frequency bin.

In other embodiments, the combination of FFIR outputs is produced by an equivalent implementation that comprises only a master MRC filter and eliminates the slave MRC filter.

The disclosed receiver configurations are highly scalable and lend themselves to straightforward and modular implementation. As will be shown below, data flow in these configurations is modest and unidirectional—Only from the slave equalizer to the master equalizer. Since each of the equalizers converges separately using its respective decoder, convergence is faster and more stable than when both equalizers converge together. The weighted combination of the master and slave equalizer outputs enables the receiver to utilize the outputs of both processing chains optimally, and to decode the signal with high performance under various channel conditions (e.g., SNRs) in the master and slave processing chains.

Because of the simple interface between the master and slave equalizers, it is feasible to implement each equalizer in a separate chip or device. Receiver configurations having a master equalizer and multiple slave equalizers can be implemented by "daisy-chaining" the slave equalizers to one another.

System Description

FIG. 1 is a block diagram that schematically illustrates a diversity receiver 20, in accordance with an embodiment of the present invention. In the present example, receiver 20 is used for Mobile Digital television (MDTV) reception, such as in an Advanced Television Systems Committee (ATSC) compliant receiver. In alternative embodiments, however, receiver 20 can be used in any other suitable communication system.

Receiver 20 receives a signal that carries data from a transmitter (not shown in the figure), and decodes the signal using antenna diversity. In the present example, the receiver comprises two processing chains that are referred to as a master chain and a slave chain. (The processing chains are also referred to herein as equalizer chains, or simply chains for brevity.) Each processing chain carries out Turbo equalization using techniques that are explained in detail herein.

The slave chain (shown at the bottom of FIG. 1) comprises an antenna 24A for receiving a Radio Frequency (RF) signal from the transmitter. As will be detailed below, the received signal at the slave receiver input is modeled as having traversed a communication channel between the transmitter and receiver, and summed with a noise component. A Radio Frequency Front End (RF FE) 28A down-converts the RF signal to baseband, applies functions such as low-noise amplification and filtering, and digitizes the baseband signal. The baseband signal is then equalized by an adaptive equalizer referred to as a slave equalizer. The signal at the input to the slave equalizer is given by:

$$Y_0 = H_0[x - \hat{x}] + \eta_0$$

wherein $H_0$ denotes the channel response from the transmitter to antenna 24A, x denotes the transmitted signal, $\hat{x}$ denotes the decoder estimation of x, and $\eta_0$ denotes the noise at the input of the slave equalizer.

The slave equalizer comprises a Forward Finite Impulse response filter (FFIR) 32A denoted FFIR1, a slave decoder 36A and a Backward Filter (BFIR) 40A. The slave equalizer carries out Turbo equalization: Slave decoder 36A accepts the output of FFIR1 as input, and produces a soft output that is indicative of the bit values carried by the received signal. In some embodiments, the soft output of the decoder comprises likelihood measures, e.g., Log Likelihood Ratios (LLRs), of the respective bits.

The slave equalizer adapts the coefficients of FFIR1 based on $\hat{x}$, the estimation of the transmitted signal x, which is computed from the soft outputs of decoder 36A. In the present example, the slave equalizer subtracts $\hat{x}$, the estimation of x, from the output of FFIR1 so as to produce an error signal, and adapts the coefficients of FFIR1 using this error signal.

The output of decoder 36A is also provided to BFIR 40A, and also summed to the output of FFIR1. The output of BFIR 40A is subtracted from the received signal before it is provided to FFIR1. In some embodiments, the slave equalizer scales the output of FFIR1 by a gain term denoted GAIN1 before entering decoder 36A, in order to match the output of FFIR1 to the magnitude of the nominal symbol constellation used by the receiver. In an embodiment, GAIN1 is given by $(\Sigma h_{1,D-i} f_{1,i})^{-1}$, wherein h denotes the communication channel impulse response, D denotes the channel length and f denotes the impulse response of the FFIR1 filter.

Using this process, FFIR1 converges to maximize the Signal to Noise Ratio (SNR) in the equalized signal provided to decoder 36A. In some embodiments, the response of BFIR 40A is set to (or converges to) the response of the communication channel between the transmitter and antenna 24A, denoted H1. In other embodiments, the BFIR response may be set or converge to meet other criteria, such as minimal Inter-Symbol Interference (ISI). The slave equalizer typically operates iteratively at block level, i.e., performs adaptation iterations on a block of previously-received signal samples that are stored in memory. Additional aspects of this form of Turbo equalization are addressed in U.S. patent application Ser. No. 13/187,525, cited above.

The master chain (shown at the top of FIG. 1) comprises an antenna 24B for receiving the RF signal from the transmitter. The signal received at antenna 24B is typically different from the signal received at antenna 24A, since the communication channels to antenna 24A and to antenna 24B are different. Here too, the received signal is modeled as having traversed a communication channel between the transmitter and receiver, and summed with a noise component.

An RF FE 28B down-converts the RF signal received by antenna 24B to baseband, applies functions such as low-noise amplification and filtering, and digitizes the baseband signal. The baseband signal is then equalized by an adaptive equalizer referred to as a master equalizer, which comprises a forward filter 32B denoted FFIR0, a master decoder 36B and a Backward Filter (BFIR) 40B.

The signal at the input to the master equalizer is given by:

$$Y_1 = H_1[x - \hat{x}] + \eta_1$$

wherein $H_1$ denotes the channel response from the transmitter to antenna 24B and $\eta_1$ denotes the noise at the input of the master equalizer.

The master equalizer carries out Turbo equalization in a similar manner to the slave equalizer, as described above. The iterative process typically causes the coefficients of FFIR0 to converge so as to maximize the SNR in the equalized signal provided to decoder 36B. The response of BFIR 40B is set to (or converges to) the channel response between the transmitter and antenna 24B, denoted H0. In the present example, the master equalizer scales the output of FFIR0 by a gain term denoted GAIN0 before entering decoder 36B. In an embodiment, GAIN0 is given by $(\Sigma h_{0,D-i} f_{0,i})^{-1}$.

Unlike the slave equalizer, however, the master equalizer does not provide the output of FFIR0 directly to decoder 36B. Instead, the master equalizer generates a weighted combination of the output of FFIR0 (in the master equalizer) and the output of FFIR1 (obtained from the slave equalizer), and provides the weighted combination as input to decoder 36B.

The master equalizer may generate this weighted combination in various ways. In the embodiment of FIG. 1, the master equalizer comprises two Maximum Ratio Combining (MRC) filters—A slave MRC filter 44A and a master MRC filter 44B. The slave MRC filter filters the output of FFIR1 in the slave equalizer, and the master MRC filter filters the output of FFIR0 in the master equalizer. The master equalizer sums the outputs of the two MRC filters, and provides the sum as input to master decoder 36B.

In an embodiment, each of MRC filters 44A and 44B comprises a FIR filter having a set of adaptive coefficients. The slave equalizer comprises an MRC calculation module 48A that calculates the spectrum of the error or noise at the output of FFIR1, and the master equalizer comprises an MRC calculation module 48B that calculates the spectrum of the error or noise at the output of FFIR0. The noise spectrum in each equalizer comprises a vector in the frequency domain, which is calculated based on the errors at the respective FFIR output, e.g., using the same error signal that is used for adapting the FFIR coefficients.

In one embodiment, the noise vector is given by FFT{diag $(R_{ee})$}, wherein $R_{ee}$ denotes the autocorrelation matrix of the error at the FFIR output, diag denotes the matrix diagonal, and FFT denotes Fast Fourier Transform. Alternatively, modules 48A and 48B may calculate or estimate the noise spectra using any other suitable method. MRC calculation modules 48A and 48B provide the noise spectra they calculate to a coefficient calculation unit 50 in the master equalizer. Unit 50 calculates the coefficients of slave MRC filter 44A and master MRC filter 44B based on the noise spectra from the slave and master equalizers.

In one embodiment, unit 50 calculates the MRC filter coefficients using the following equations:

$$MRC_{master} = IFFT\left\{\frac{SNR_{master}(f)}{SNR_{master}(f) + SNR_{slave}(f)}\right\}$$

$$= IFFT\left\{\frac{N_{slave}(f)}{N_{master}(f) + N_{slave}(f)}\right\}$$

$$MRC_{slave} = IFFT\left\{\frac{SNR_{slave}(f)}{SNR_{master}(f) + SNR_{slave}(f)}\right\}$$
$$= IFFT\left\{\frac{N_{master}(f)}{N_{master}(f) + N_{slave}(f)}\right\}$$

wherein $SNR_{master}(f)$ and $SNR_{slave}(f)$ denote the spectrum of SNR in the master and slave FFIR outputs, respectively, and $N_{master}(f)$ and $N_{slave}(f)$ denote the noise spectrum vectors calculated by modules 48B and 48A, respectively. IFFT denotes inverse FFT. In alternative embodiments, unit 50 may calculate the responses of MRC filters 44A and 44B using any other suitable method.

In some embodiments, unit 50 sets the coefficients of MRC filters 44A and 44B such that the transfer function of each MRC filter is proportional to the SNR of the signal at the respective FFIR output as a function of frequency. This sort of MRC filter setting gives, for each frequency, higher weight to the chain (master or slave) having the better SNR. As a result, master decoder 36B is provided with a weighted combination of FFIR outputs that best exploits the mater and slave chains SNR as a function of frequency.

As noted above, modules 48A and 48B may estimate the noise spectrum from the error signal using any suitable method, for example by calculating or estimating a Fourier transform of the noise auto-correlation. Typically, the frequency resolution of the noise spectrum and SNR calculations is determined by the length (number of coefficients) of the MRC filters. Long MRC filters provide high frequency resolution, and vice versa.

As noted above, in some embodiments the equalizers operate at block level, on a block of previously-received signal samples. In these embodiments, receiver 20 may update the coefficients of MRC filters 44A and 44B once per block, based on $SNR_{master}(f)$ and $SNR_{slave}(f)$ of a previous block. In an alternative embodiment, the receiver updates the MRC filter coefficients on every adaptation iteration or every certain number of adaptation iterations, i.e., multiple times per block.

In some embodiments, the frequency resolution of the MRC filters may be relatively low, which enables the use of short MRC filters. In an example embodiment, the total signal bandwidth is 6 MHz, the frequency resolution of the noise spectrum and SNR estimation is 6 MHz/256=23.5 KHz, and the number of coefficients in each of the MRC filters is 256. These values, however, are chosen purely by way of example, and any other suitable values can be used in alternative embodiments.

As can be seen in FIG. 1, in the disclosed receiver configuration data flows only in one direction—From the slave equalizer to the master equalizer. The volume of data flow between the equalizers is modest. As such, this configuration lends itself to modular implementation, in which each equalizer is implemented in a separate semiconductor chip. In such an implementation, the pin count is relatively small and the interfaces between chips are relatively straightforward. Since each of the master and slave processing chains comprises its own decoder and adapts its own equalizer, convergence (e.g., using Least Mean Squares—LMS) is typically fast and stable.

The configuration of receiver 20 shown in FIG. 1 is an example configuration, which is chosen purely for the sake of conceptual clarity. In alternative embodiments, any other suitable receiver configuration can be used. For example, the master and slave Turbo equalizers can be implemented using an alternative configuration, in which $\hat{x}$ at the decoder output is provided as input to an adaptive BFIR, whose output is summed to the FFIR output. The difference between the BFIR input ($\hat{x}$) and the FFIR output (after summation with the BFIR output) is used as an error signal for adapting both the FFIR and the BFIR. This alternative configuration is described, for example, in U.S. patent application Ser. No. 13/187,525, cited above.

Further alternatively, receiver 20 can be implemented using an alternative configuration that comprises only master MRC filter 44B and eliminates slave MRC filter 44A. A configuration of this sort is described in FIG. 3 further below. Two signal points 34A and 34B are marked in FIG. 1—These signal points will be referenced in the alternative configuration of FIG. 3.

Some elements of receiver 20 may be implemented in hardware, e.g., in one or more Application-Specific Integrated Circuits (ASICs) or Field-Programmable Gate Arrays (FPGAs). Additionally or alternatively, some receiver elements can be implemented using software, or using a combination of hardware and software elements.

In some embodiments, certain functions of receiver 20 may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

As noted above, in some embodiments each of the master and slave equalizers is implemented in a separate respective chip. The receiver configuration described herein is scalable in a straightforward manner to support any desired number of processing chains, e.g., three or four processing chains. This sort of configuration provides a higher degree of diversity with a larger number of antennas. In these embodiments, the master equalizer chain calculates the weighted combination of all FFIR outputs (from the master equalizer and all slave equalizers), and provides this weighted combination to the master decoder for decoding.

In an example embodiment, two or more equalizer chains, e.g., in separate chips, can be connected to one another and then to the master equalizer in a "linear daisy chain" configuration. Such a configuration typically comprises three types of equalizers:

A master equalizer.
An intermediate equalizer, which receives data from the previous equalizer in the chain (slave or intermediate) and sends data to the next equalizer in the chain (master or intermediate).
A slave equalizer that sends data to the next equalizer in the chain (master or intermediate) but does not receive data from another equalizer in the chain.

In alternative embodiments, multiple slave equalizer chains can be connected directly to the master equalizer chain.

Diversity Turbo Equalization Method Description

Figure 2:
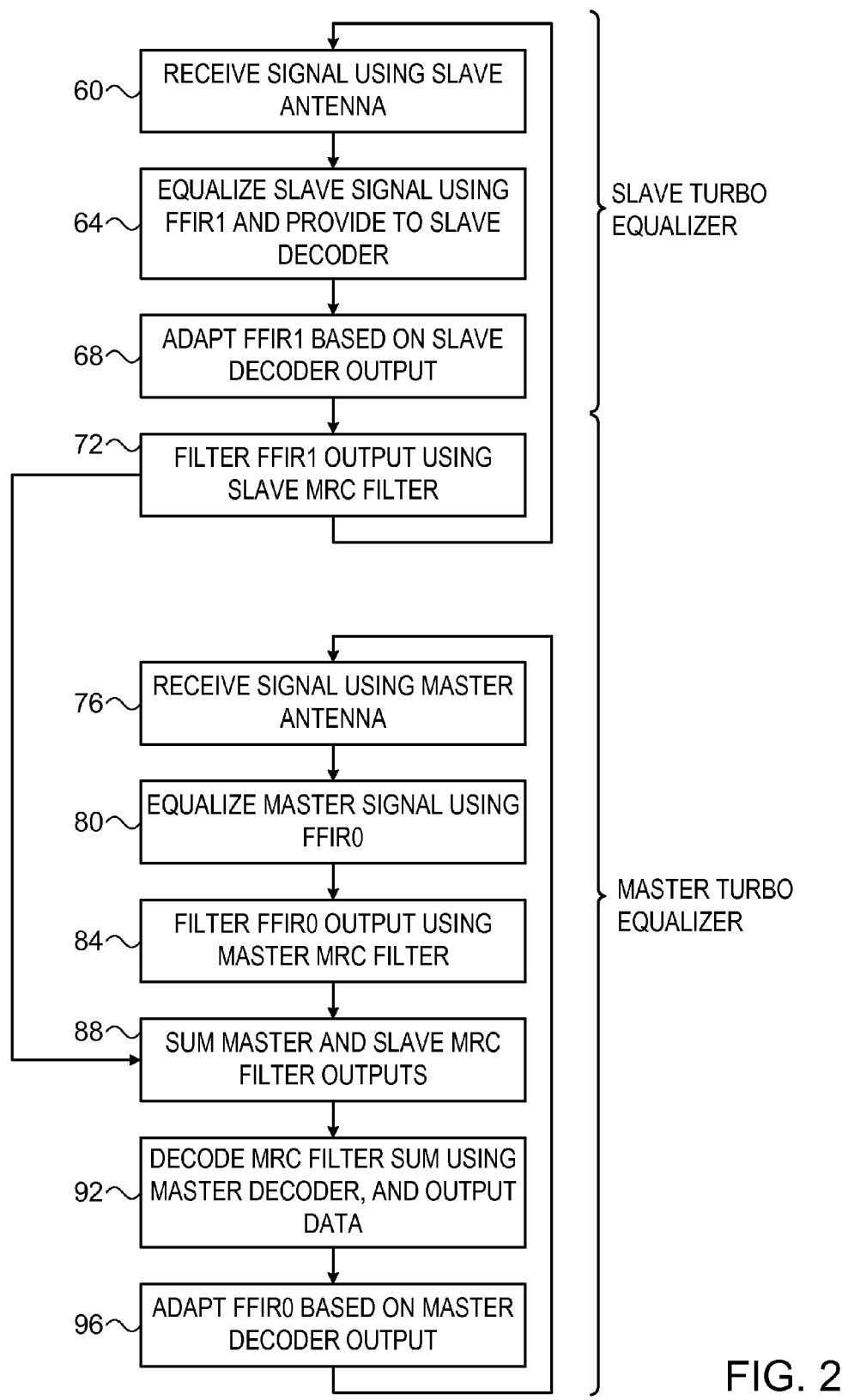
FIG. 2 is a flow chart that schematically illustrates a method for Turbo equalization in a diversity receiver, in accordance with an embodiment of the present invention.

FIG. 2 is a flow chart that schematically illustrates a method for Turbo equalization in diversity receiver 20, in accordance with an embodiment of the present invention. The method begins with the slave processing chain in receiver 20 receiving a signal using antenna 24A, at a slave reception step 60. The slave equalizer filters the received signal using FFIR1, at a slave equalization step 64, and provides the equalized signal to slave decoder 36A, which decodes the signal.

The slave equalizer adapts the coefficients of FFIR1 based on the output of slave decoder 36A, at a slave adaptation step 68. Slave MRC filter 44A filters the output of FFIR1, at a slave MRC filtering step 72.

The master processing chain in receiver 20 receives the signal using antenna 24B, at a master reception step 76. The master equalizer filters the received signal using FFIR0, at a master equalization step 80. Master MRC filter 44B filters the output of FFIR0, at a master MRC filtering step 84.

The master equalizer sums the outputs of MRC filters 44A and 44B, at a summation step 88, so as to generate the weighted combination of FFIR outputs. Master decoder 36B decodes this weighted combination, at a master decoding step 92. The master decoder reconstructs the data carried by the signal and provides the reconstructed data as output. The master equalizer adapts the coefficients of FFIR0 based on the output of master decoder 36B, at a master adaptation step 96.

The process of FIG. 2 is typically repeated multiple times on each block of signal samples. In some embodiments, process may operate in each iteration of the turbo equalizer. Alternatively, the process can be decimated and used only every $n^{th}$ iteration (e.g., n=2, 3, ... ) to reduce data transport between chips, filter calculation and power consumption.

Alternative Receiver Configuration with Single MRC Filter

Figure 3:
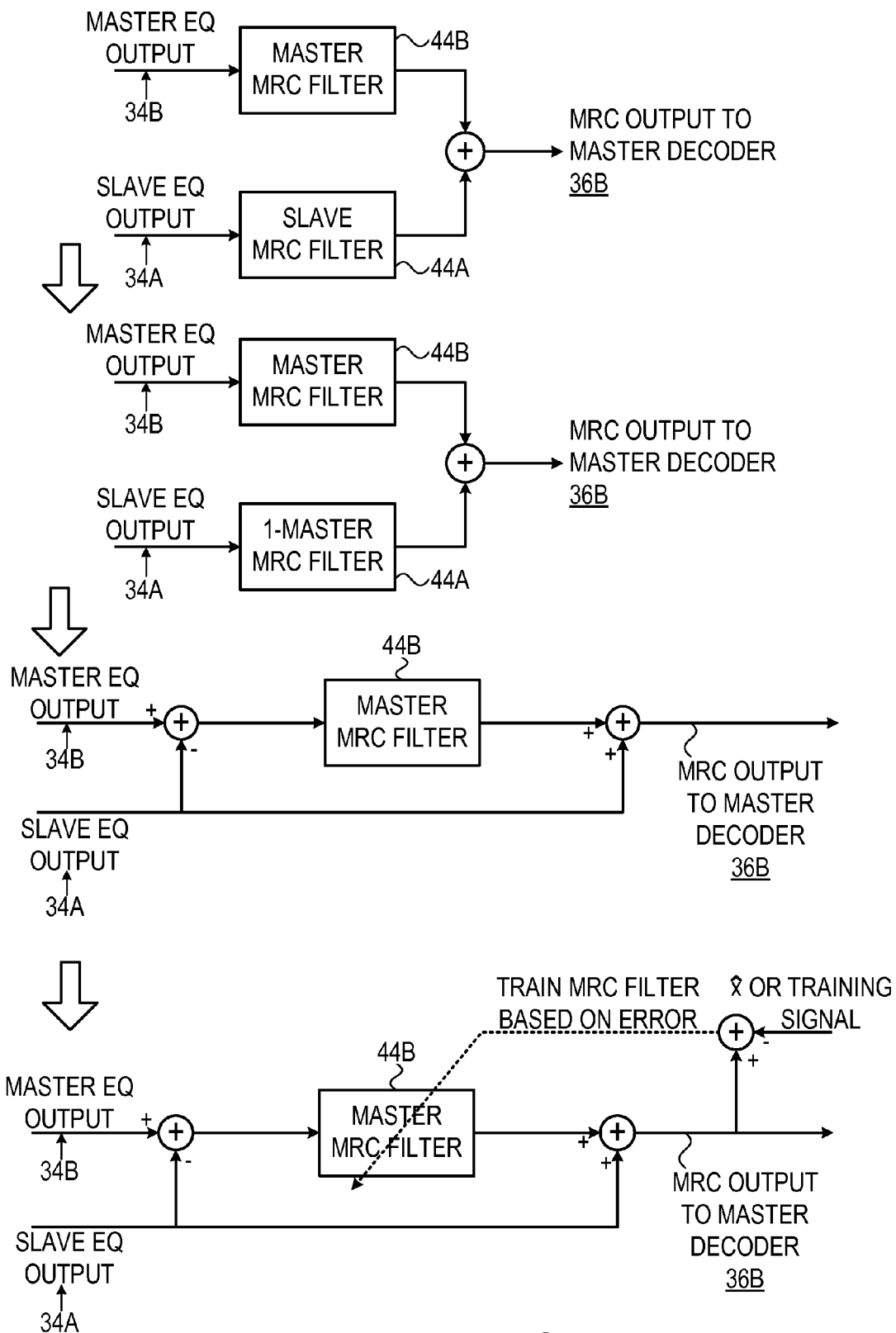
FIG. 3 is a block diagram that schematically illustrates elements of a diversity receiver, in accordance with an alternative embodiment of the present invention.

FIG. 3 is a block diagram that schematically illustrates elements diversity receiver 20, in accordance with an alternative embodiment of the present invention. This configuration produced the weighted combination of the master and slave FFIR outputs using only a single MRC filter—filter 44B. Slave MRC filter 44A, and possibly additional elements of FIG. 1, are eliminated. The configuration of FIG. 3 stems from the fact that the sum of the responses of filters 44A and 44B is unity, i.e., a delta filter in the time domain—A fact that can be seen from the MRC filter equations given above.

The top diagram in FIG. 3 shows the arrangement of MRC filters 44A and 44B as they are used in the configuration of FIG. 1 above: Filter 44A filters the output of FFIR1 after gain correction (the signal at signal point 34A), filter 44B filters the output of FFIR0 after gain correction (the signal at signal point 34B), and the outputs of filters 44A and 44B are summed and provided to master decoder 36B.

In the second diagram of FIG. 3, the response of slave MRC filter 44A is replaced with unity minus the response of master MRC filter 44B, as explained above. The third diagram of FIG. 3 shows an equivalent implementation of this configuration with a single master MRC filter. In this equivalent implementation, master MRC filter 44B filters the difference between the outputs of FFIR1 and FFIR0. An adder circuit sums The output of filter 44B and the output of FFIR1, to produce the weighted combination of FFIR outputs that is provided to master decoder 36B.

The last diagram, at the bottom of FIG. 3, shows the single-filter configuration together with an example scheme for training the master MRC filter, in accordance with an embodiment of the present invention. This configuration can be used to replace part of the elements of receiver 20 in FIG. 1 (namely replacing MRC filters 44A and 44B, MRC calculation modules 48A and 48B, and coefficient calculation unit 50).

In this example training scheme, an error signal is produced by taking the difference between the equalized signal provided to master decoder 36B and 2. The error signal is used for training the coefficients of filter 44B. For example, the filter can be trained using an adaptive control process (e.g., LMS) that aims to minimize the expectancy of the error signal. Alternatively to using $\hat{x}$, the error signal can be produced using another type of signal, e.g., a known training signal. This sort of filter coefficient training typically has lower computational complexity relative to the coefficient computation scheme of FIG. 1 above.

Further alternatively, however, the coefficients of the MRC filter 44B of FIG. 3 can be calculated using modules 48A and 48B and unit 50, as explained above.

Although the embodiments described herein mainly address ATSC receivers, the methods and systems described herein can also be used in various other applications, such as in other single-carrier communication systems.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An equalization apparatus, comprising:
a slave equalizer chain, which comprises a first decoder and a first adaptive filter comprising first coefficients, and which is configured to receive a first signal from a first antenna, to filter the first signal using the first adaptive filter to produce a first filtered signal, to decode the first filtered signal using the first decoder so as to generate a first output, and to adapt the first coefficients based at least on the first output; and
a master equalizer chain, which comprises a second decoder and a second adaptive filter comprising second coefficients, and which is configured to receive a second signal from a second antenna, to filter the second signal using the second adaptive filter to produce a second filtered signal, to calculate using at least one weighting filter a weighted combination of the second filtered signal and the first filtered signal produced in the slave equalizer chain, to decode the weighted combination using the second decoder so as to generate a second output, and to adapt the second coefficients based at least on the second output.

2. The apparatus according to claim 1, wherein the at least one weighting filter comprises first and second weighting filters that are configured to filter the first filtered signal and the second filtered signal, respectively, so as to produce the weighted combination.

3. The apparatus according to claim 2, wherein the first and second weighting filters have respective first and second transfer functions, which depend on a first Signal to Noise Ratio (SNR) of the first filtered signal as a function of frequency and on a second SNR of the second filtered signal as a function of frequency.

4. The apparatus according to claim 3, wherein the master and slave equalizer chains are configured to estimate respective first and second noise spectra of the first and second filtered signals, to compute the first and second SNRs based on the first and second noise spectra, and to calculate and set the first and second transfer functions based on the first and second SNRs.

5. The apparatus according to claim 2, wherein the master and slave equalizer chains are configured to adapt respective responses of the first and second weighting filters depending on the first and second filtered signals.

6. The apparatus according to claim 1, wherein the at least one weighting filter comprises a single weighting filter that is configured to filter a difference between the first filtered signal and the second filtered signal, and further comprising a circuit for summing an output of the single weighting filter with the first filtered signal, so as to produce the weighted combination.

7. The apparatus according to claim 6, wherein the master equalizer chain is configured to adapt a response of the single weighting filter so as to reduce an error in the weighted combination.

8. The apparatus according to claim 1, wherein the master and slave equalizer chains are configured to communicate only unidirectionally, from the slave equalizer chain to the master equalizer chain.

9. The apparatus according to claim 1, further comprising at least an additional slave equalizer chain, which comprises a third decoder and a third adaptive filter comprising third coefficients, and which is configured to receive a third signal from a third antenna, to filter the third signal using the third adaptive filter to produce a third filtered signal, to decode the third filtered signal using the third decoder so as to generate a third output, to adapt the third coefficients based at least on the third output, wherein the master equalizer chain is configured to calculate the weighted combination based on the first, second and third filtered signals.

10. The apparatus according to claim 9, wherein the slave equalizer chain comprises an intermediate equalizer chain, and wherein the master, intermediate and additional slave equalizer chains are connected in a daisy chain such that the additional slave equalizer chain is connected to the intermediate equalizer chain and the intermediate equalizer chain is connected to the master equalizer chain.

11. The apparatus according to claim 1, wherein the master and slave equalizer chains are implemented in respective, different semiconductor chips.

12. The apparatus according to claim 1, wherein the master and slave equalizer chains are configured to adapt the first and second coefficients by applying a sequence of adaptation iterations to a block of previously-received samples of the first and second signals that are stored in a memory.

13. A method for equalization, comprising:
receiving a first signal from a first antenna, filtering the first signal using a first adaptive filter comprising first coefficients to produce a first filtered signal, decoding the first filtered signal using a first decoder to produce a first output, and adapting the first coefficients based at least on the first output;
receiving a second signal from a second antenna, and filtering the second signal using a second adaptive filter comprising second coefficients to produce a second filtered signal;
calculating a weighted combination of the second filtered signal and the first filtered signal using at least one weighting filter;
decoding the weighted combination using a second decoder to produce a second output; and
adapting the second coefficients of the second adaptive filter based at least on the second output.

14. The method according to claim 13, further comprising generating the weighted combination by filtering the first and second filtered signals with first and second weighting filters, respectively.

15. The method according to claim 14, wherein the first and second weighting filters have respective first and second transfer functions, which depend on a first Signal to Noise Ratio (SNR) of the first filtered signal as a function of frequency and on a second SNR of the second filtered signal as a function of frequency.

16. The method according to claim 15, wherein generating the weighted combination comprises estimating respective first and second noise spectra of the first and second filtered signals, computing the first and second SNRs based on the first and second noise spectra, and calculating and setting the first and second transfer functions based on the first and second SNRs.

17. The method according to claim 14, wherein generating the weighted combination comprises adapting respective responses of the first and second weighting filters depending on the first and second filtered signals.

18. The method according to claim 13, further comprising generating the weighted combination by filtering a difference between the first filtered signal and the second filtered signal with a single weighting filter, and summing an output of the single weighting filter with the first filtered signal so as to produce the weighted combination.

19. The method according to claim 18, further comprising adapting a response of the single weighting filter so as to reduce an error in the weighted combination.

20. The method according to claim 13, further comprising communicating between a slave equalizer chain containing the first adaptive filter and a master equalizer chain containing the second adaptive filter only unidirectionally, from the slave equalizer chain to the master equalizer chain.

21. The method according to claim 13, further comprising receiving at least a third signal from a third antenna, filtering the third signal using a third adaptive filter comprising third coefficients to produce a third filtered signal, decoding the third filtered signal using a third decoder so as to generate a third output, adapting the third coefficients based at least on the third output, and calculating the weighted combination based on the first, second and third filtered signals.

22. The method according to claim 21, wherein the first adaptive filter is comprised in an intermediate equalizer chain, wherein the second adaptive filter is comprised in a master equalizer chain, wherein the third adaptive filter is comprised in a slave equalizer chain, and wherein the master, intermediate and slave equalizer chains are connected in a daisy chain such that the slave equalizer chain is connected to the intermediate equalizer chain and the intermediate equalizer chain is connected to the master equalizer chain.

23. The method according to claim 13, wherein the first and second adaptive filters are implemented in respective, different semiconductor chips.

24. The method according to claim 13, wherein adapting the first and second coefficients comprises applying a sequence of adaptation iterations to a block of previously-received samples of the first and second signals that are stored in a memory.

* * * * *